United States Patent
Rootsey et al.

[11] Patent Number: 5,995,804
[45] Date of Patent: Nov. 30, 1999

[54] REPEATER STATION FOR AUGMENTING THE COVERAGE AREA OF A PAGING SYSTEM

[75] Inventors: James V. Rootsey, Addison, Tex.; James F. Roesch, Jr.; David B. Bradley, both of Melbourne, Fla.

[73] Assignee: Flash Comm. Inc., Melbourne, Fla.

[21] Appl. No.: 08/784,451

[22] Filed: Jan. 16, 1997

[51] Int. Cl.⁶ .................................................. H04Q 7/06
[52] U.S. Cl. .................. 455/11.1; 455/38.1; 455/575; 455/95; 455/345; 340/825.44
[58] Field of Search .................... 455/11.1, 38.1, 455/227, 228, 345, 575, 95; 340/825.44

[56] References Cited

U.S. PATENT DOCUMENTS

| | | | |
|---|---|---|---|
| 4,276,653 | 6/1981 | Aarsen et al. | 455/56 |
| 4,906,989 | 3/1990 | Kasugai | 455/11.1 X |
| 5,056,152 | 10/1991 | Truby et al. | 455/11.1 |
| 5,278,990 | 1/1994 | Van Den Heuvel et al. | 455/15 |
| 5,301,354 | 4/1994 | Schwendeman et al. | 455/13.1 |
| 5,363,426 | 11/1994 | Nyhart | 379/57 |
| 5,404,569 | 4/1995 | Schwendeman et al. | 455/13.4 |
| 5,446,924 | 8/1995 | Christian et al. | 455/8 |
| 5,475,863 | 12/1995 | Simpson et al. | 455/33.1 |
| 5,506,886 | 4/1996 | Maine et al. | 379/57 |
| 5,519,761 | 5/1996 | Gilhousen | 455/11.1 X |
| 5,543,785 | 8/1996 | Vatt et al. | 345/825.44 |
| 5,574,970 | 11/1996 | Linquist et al. | 455/13.1 |

*Primary Examiner*—Wellington Chin
*Assistant Examiner*—Philip J. Sobutka
*Attorney, Agent, or Firm*—Hamilton, Brook, Smith & Reynolds, P.C.

[57] ABSTRACT

A low power miniature repeater station is located on a vehicle such as a train, cargo ship, cruise ship or other vehicle which is expected to carry multiple paging receivers. The repeater station receives paging messages that originate as satellite signals and rebroadcasts them in the immediate vicinity of the vessel. The rebroadcast may typically be over a single FM carrier frequency or in the form of a subcarrier signal. The repeater includes an FM scanning receiver that samples the radio band and enables the rebroadcast of signals only if FM subcarrier signals are not detected within the vicinity of the vehicle. As the vehicle re-approaches a populated area, continued scanning of the radio band eventually detects the presence of subcarrier signals and shuts down the repeater to ensure that it will not interfere with licensed terrestrial broadcasters.

6 Claims, 3 Drawing Sheets

REPEATER STATION FOR AUGMENTING THE COVERAGE AREA OF A PAGING SYSTEM

This invention relates generally to paging systems and in particular to a technique for providing access to paging receivers that are located outside of the range of conventional terrestrial repeater equipment.

BACKGROUND OF THE INVENTION

It is common to distribute paging messages to individual paging receivers (pagers) by using existing radio or television stations as repeaters. The messages originate at a paging terminal which receives information to be sent to the pagers from, for example, a telephone call made via the public switched telephone network. The paging message is then formatted into a paging signal suitable for radio transmission.

In wide area systems, such as may be used to cover the United States, the paging signal is first transmitted on a satellite uplink to an orbiting satellite. The satellite contains a radio transceiver which decodes and remodulates the uplink signal for transmission on a number of downlink signals. The downlink signals are then received by terrestrial repeater stations. These terrestrial repeater stations are typically located at the site of an existing commercial frequency modulated (FM) radio or television broadcaster. The repeater station receives the downlink paging signals, reformats them, and then broadcasts them on one of several radio frequencies to pagers located within range of the repeater station. These paging receivers may be of the type carried by persons or may be mounted in or on vehicles.

The United States' Federal Communications Commission (FCC) has provided for so-called Subsidiary Communications Authorization (SCA) programming in which a licensed FM radio station may broadcast multiple secondary programs of audio or data signals. The secondary signals are broadcast using subcarriers located at, for example, 67 or 92 kilohertz (kHz) offset from the licensed radio carrier frequency.

Such SCA broadcasts are commonly used for carrying paging signals from the existing radio tower to pagers located within the range of the FM station. Since the paging messages are carried as an SCA-type subcarrier signal, they do not interfere with the primary commercial FM broadcast of audio programs.

With this arrangement, it is not possible to deliver messages to pagers that are located in areas which are not covered by existing FM stations. It is therefore believed that such paging systems have a coverage area limited to locations in which licensed FM radio stations are operating. Such paging systems have not been applied in certain contexts as a result.

For example, in the instance of a cargo tracking system, it might be possible to install pagers in each cargo container for receiving information from a central control point as the containers travel via trucks, ships and/or trains from place to place. It is common for cargo containers to be loaded onto wide ranging vehicles such as a ship that is travelling on the open sea or a cross-continental train that is moving through a remote area. However, an SCA subcarrier paging system as has been described above could not be reliably used when the vehicle travels outside of the range of the FM broadcast stations.

Although each container could be equipped with a satellite dish and receiver, such satellite equipment tends to be fairly expensive. In addition, the prospect of equipping each container with a satellite antenna would typically be undesirable. Such satellite equipment is fairly large and protrudes outside of the container, and would therefore be prone to breakage.

What is needed is a way to enable a paging system to reach or otherwise communicate using FM repeater type subcarrier signalling even when such pagers are located in remote areas such as in the wilderness or the ocean which are outside of the range of commercial FM stations. At the same time the system should avoid the high cost of direct satellite receiving equipment for each container.

SUMMARY OF THE INVENTION

The invention is a technique for supplementing the coverage area of a paging system that uses existing radio stations as repeaters for a primary message delivery. In accordance with the. invention, a relatively low power miniature radio station (repeater) is located on a vehicle that is expected to carry multiple paging receivers (pagers). The low power repeater station is equipped with a satellite receiver that receives paging messages broadcast by satellites. The miniature repeater station reformats any received paging messages and then rebroadcasts the messages as a low power local signal to pagers located on or in the vicinity of the vehicle.

While the vehicle is located in a populated area with terrestrial station coverage, the low power station is disabled and paging messages are delivered to the pagers via the primary terrestrial repeater station network.

Because a rebroadcast of signals might typically violate radio communication broadcast regulations or otherwise interfere with existing terrestrial stations, especially in highly populated areas, the repeater station only radiates on a non-interference basis, for example, by ensuring that the repeater station transmitter is enabled only when the vehicle is located outside of the range of other terrestrial stations.

In a first embodiment, a scanning receiver continuously samples the radio band that is expected to be used by the repeater station. If no signal energy is detected in the band, an assumption is made that the vehicle is located outside the range of other stations. Only then is the low power transmitter enabled.

While the low power station is enabled, the scanning receiver continues to monitor the radio band and shuts down the low power transmitter in the event that radio signals are detected. This may occur, for example, as the vehicle travels close to a populated area.

In an alternative embodiment, a position determining receiver such as a Global Positioning System (GPS) receiver can be used together with a broadcast station location database to determine the location of the vehicle.

In connection with a preferred embodiment of the invention, the repeater station only rebroadcasts the paging message as a subcarrier signal and not as a primary radio carrier signal. As a result, in the event that an error is made in determining whether the vehicle is located in a desolate area, interference with any existing broadcast stations in the vicinity of the vehicle is minimized.

BRIEF DESCRIPTION OF THE DRAWINGS

A more complete understanding of the invention may be had by referring to the following detailed description and claims when considered in conjunction with the drawings, where:

DETAILED DESCRIPTION OF A PREFERRED EMBODIMENT

Figure 1:
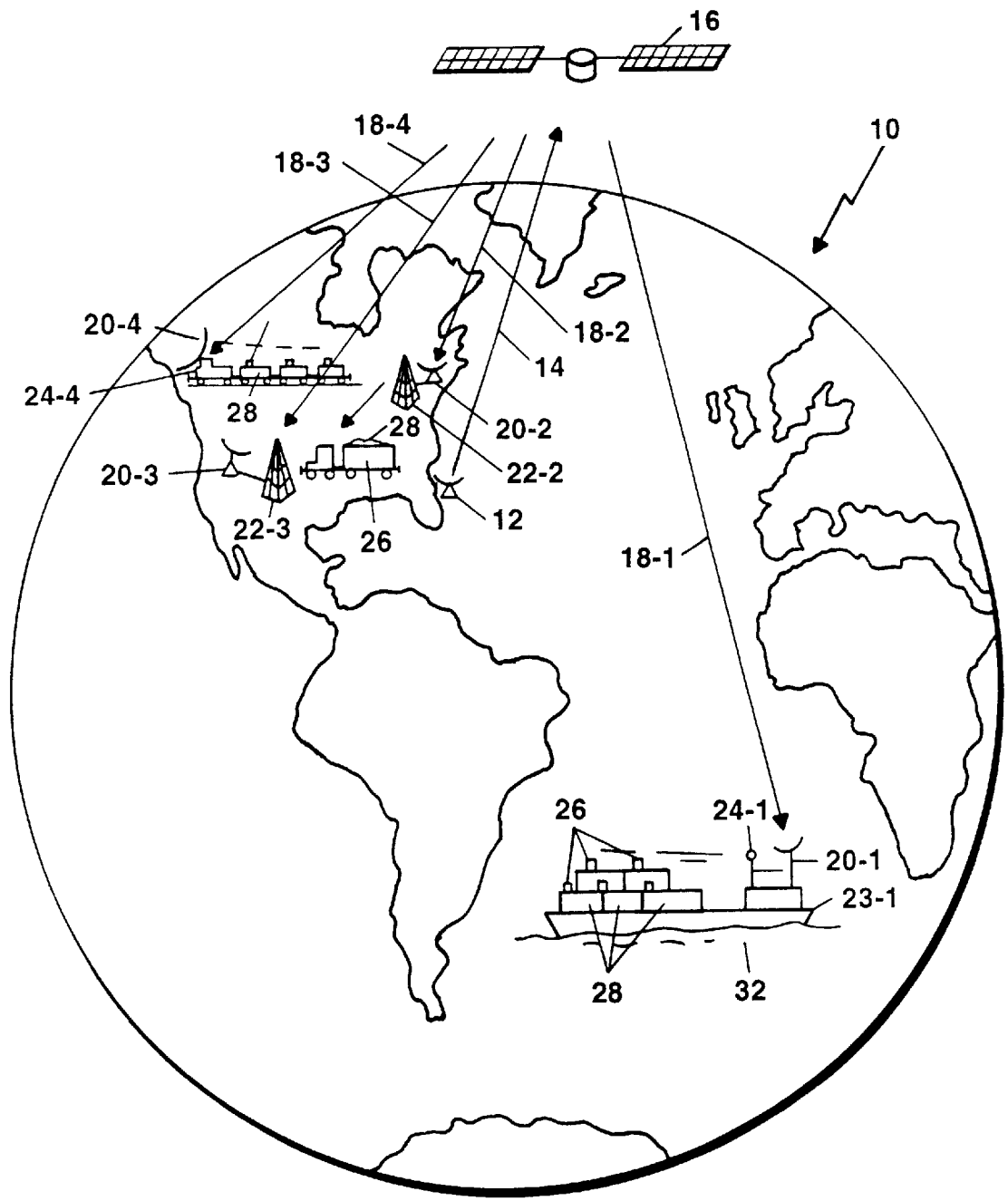
FIG. 1 is a pictorial diagram of a portion of the Earth in which a paging system configured according to the invention may be implemented.

FIG. 1 is a pictorial diagram of a paging system 10 in accordance with a preferred embodiment of the invention. The system 10 includes a paging terminal 12, a satellite uplink 14, one or more satellites 16, satellite downlinks 18, downlink signal receivers 20, terrestrial broadcast stations 22, miniature low power radio stations (repeaters) 24, paging receivers (pagers) 26, containers 28, and vehicles such as a ship 32, train 34, or truck 36.

Certain vehicles 32, 34 or 36 in the illustrated system 10 carry containers 28 that each include paging receivers 26. A paging receiver 26 is typically associated with each container 28 and receives data intended for electronic equipment located on the container 28.

At least some of the vehicles such as the ship 32 or train 34 are of the type that carry multiple containers 28 and pagers 26. Such vehicles 32 or 34 are equipped with a low power repeater station 24 that operates according to the invention.

Although the illustrated system 10 uses pagers 26 for tracking cargo containers 28, it should be understood that the system 10 can also be used to deliver messages to pagers 26 carried by persons on a passenger ship or train.

The system 10 delivers paging messages via the satellite 16 in a conventional manner and also delivers such messages according to techniques per the invention.

In the conventional manner of message delivery, paging messages originate at the paging terminal 12 and are transmitted via the uplink 14 to the satellite 16. The paging messages are received at the satellite 16 and then reformatted in an appropriate fashion for transmission on one of the downlinks such as downlink 18-2. The downlink 18-2, in turn, carries the paging message to an existing terrestrial station 22-2 such as may be at the site of a commercial FM radio or a television station. The terrestrial station 22-2 includes a satellite receiver 20-2 for receiving the downlink signal 18-2 as well as commercial broadcast equipment (not shown except as a radio tower).

The satellite receiver 20-2 reformats the paging message for transmission by the terrestrial broadcast equipment. This, for example, may be commercial broadcast equipment licensed to operate in the 88–108 MHz (FM) band. The terrestrial station 22-2 typically broadcasts the paging signal as a subcarrier on a standard FM radio frequency carrier. This may be in accordance with well known Subsidiary Communication Authorization (SCA) or other subcarrier modulation techniques.

As a result, paging devices located within the range of the terrestrial station 22-2 receive the paging messages. For example, a pager 28-2 may be located on a container 26-2 that forms a part of a truck 30 travelling through a populated area such as, for example, may be located on a highway in the southeastern United States within range of an FM radio station in Atlanta, Ga.

The present invention lies in also providing a mechanism for routing messages to remote pagers 26 located on vessels that are outside of the range of the terrestrial stations 22-2 or 22-3. Such remote pagers 26 may, for example, be located on containers 28 on a ship 32 sailing in the southern Atlantic Ocean. Such remote pagers 26 may also be located on a land vehicle travelling in a desolate or unpopulated area of a continent such as a train 34 travelling through a remote area of Montana in the United States.

The ship 32 or train 34 are vehicles of the type upon which multiple pagers 26 are expected to be located. For example, in the case of the ship 32, multiple cargo containers 28 may each contain a pager 26.

In any event, each such vehicle 32 or 34 is equipped with a miniature repeater station 23 according to the invention. An exemplary station 23-1 located on the ship 32 includes a downlink signal receiver 20-1 and a low power FM transmitter 24-1. The downlink receiver 20-1 receives the downlink signal 18-1 from the satellite 16 and reformats it for transmission by the low power FM transmitter 24-1. The FM transmitter 24-1 operates at a power level sufficient to transmit signals only within the intermediate range of the ship 32, including the pagers 26 located on containers 28 on the ship 32.

A similar station 23-4 including satellite receiver 20-4 and low power FM transmitter 24-4 is located on the train 34.

Figure 2:
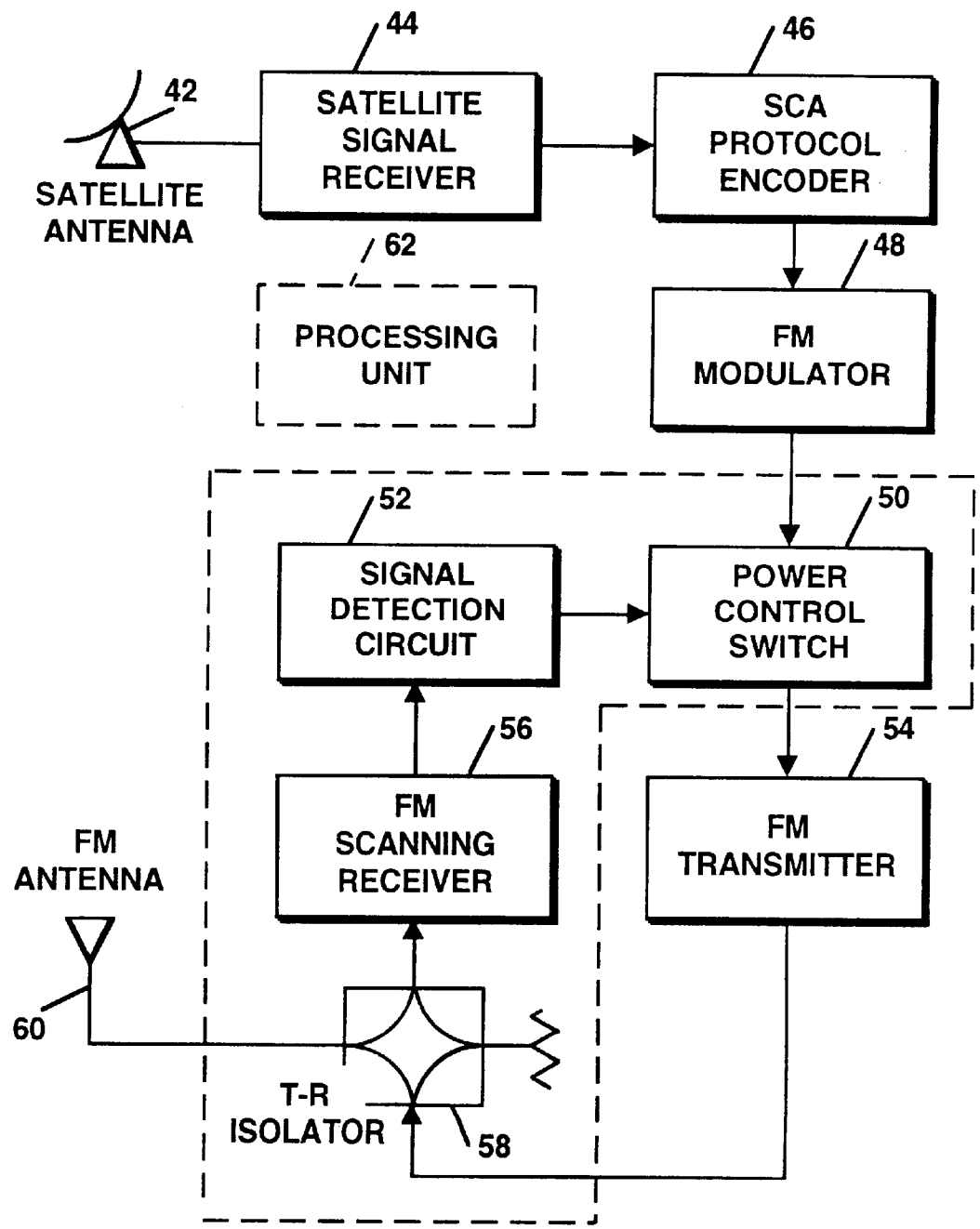
FIG. 2 is a block diagram of the components of a vehicle-mounted low power repeater station according to the invention.

A more detailed block diagram of a low power repeater station 23 in accordance with the invention is depicted in FIG. 2. The repeater station 23 includes a satellite signal antenna 42, a satellite signal receiver 44 (which corresponds to the satellite signal receiver 20 of FIG. 1), an SCA protocol encoder 46, an FM modulator 48, a power control switch 50, a signal detection circuit 52, an FM transmitter 54, an FM scanning receiver 56, a transmit/receive isolator 58 and an FM antenna 60.

The satellite antenna 42, signal receiver 44, SCA protocol encoder 46, FM modulator 48, FM transmitter 54 and FM antenna 60 are connected as in the terrestrial station 22, with the exception that the FM antenna 60 may be physically much smaller antenna since the area of coverage is relatively small for the vehicle-mounted repeater station 23.

The components of the repeater station 23 which are unique to the invention include the power control switch 50, signal detection circuit 52, FM scanning receiver 56 and transmit/receive isolator 58.

In particular, in order to avoid violating radio communication licensing rules or to otherwise avoid interference with other radio transmitters operating outside of the system 10, precautions are taken by the repeater station 23 to ensure that it radiates only on a non-interfering basis.

In particular, the power control switch 50 and transmit/receive isolator 58 are used to periodically allow the FM antenna 60 to connect to the scanning receiver 56. The scanning receiver 56 then samples the radio band used by the FM transmitter 54. The presence of other radiating FM stations in the area of the vehicle 32 is detected at the output of the scanning receiver 56, as may be determined by the signal detection circuit 52. This can be done by comparing specified receive power levels to a predetermined threshold.

If no frequency in the radio band exhibits a receive power level above the predetermined threshold, then it is known that the repeater station 23 is in a desolate location. At this point, the repeater station 23 determines that it has a permission to rebroadcast the satellite signal received on the satellite antenna 42. Upon such determination, the power control switch 50 is operated to connect the FM transmitter 54 and transmit isolator 58 to couple the signal produced by the FM modulator 48 through the FM transmitter 54 out through the antenna 60.

The FM signal rebroadcast is preferably done at a low power level on any observed unoccupied frequency. The power level is set to be sufficient only to excite pagers 26 that may be located on board or in the vicinity of the vehicle 32 or 34 on which the repeater station 23 is located.

It is preferred that only a specific SCA subcarrier signal is generated by the FM modulator 48 and transmitter 54. This reduces interference in the unlikely event of an FM broadcast transmitter being licensed in the area of the vehicle and through some error the power control switch 50 being improperly operated to enable the FM transmitter 54. In such an instance, since only the subcarrier will be rebroadcasted and all the station power is used to that end, interference is created only in fringe areas of other nearby stations.

The components of the repeater station 23 also operate to shut down the transmitter 54 when the vehicle approaches a populated area. In particular, while the FM transmitter 54 is enabled, the power control switch 50, isolator 58 and scanning receiver 56 are still enabled to periodically scan the FM band. As the vehicle travels about and eventually returns to a populated area, the scanning receiver 56 eventually detects the presence of one or more signals in the FM band.

Upon such determination by the detection circuit 52, the power control switch 50 operates to disable the FM transmitter 54. The repeater station 23 thus does not interfere with any existing licensed FM broadcast station as the vehicle reenters a populated area. Radiation of signals when other licensed users may be present is thus avoided.

Figure 3:
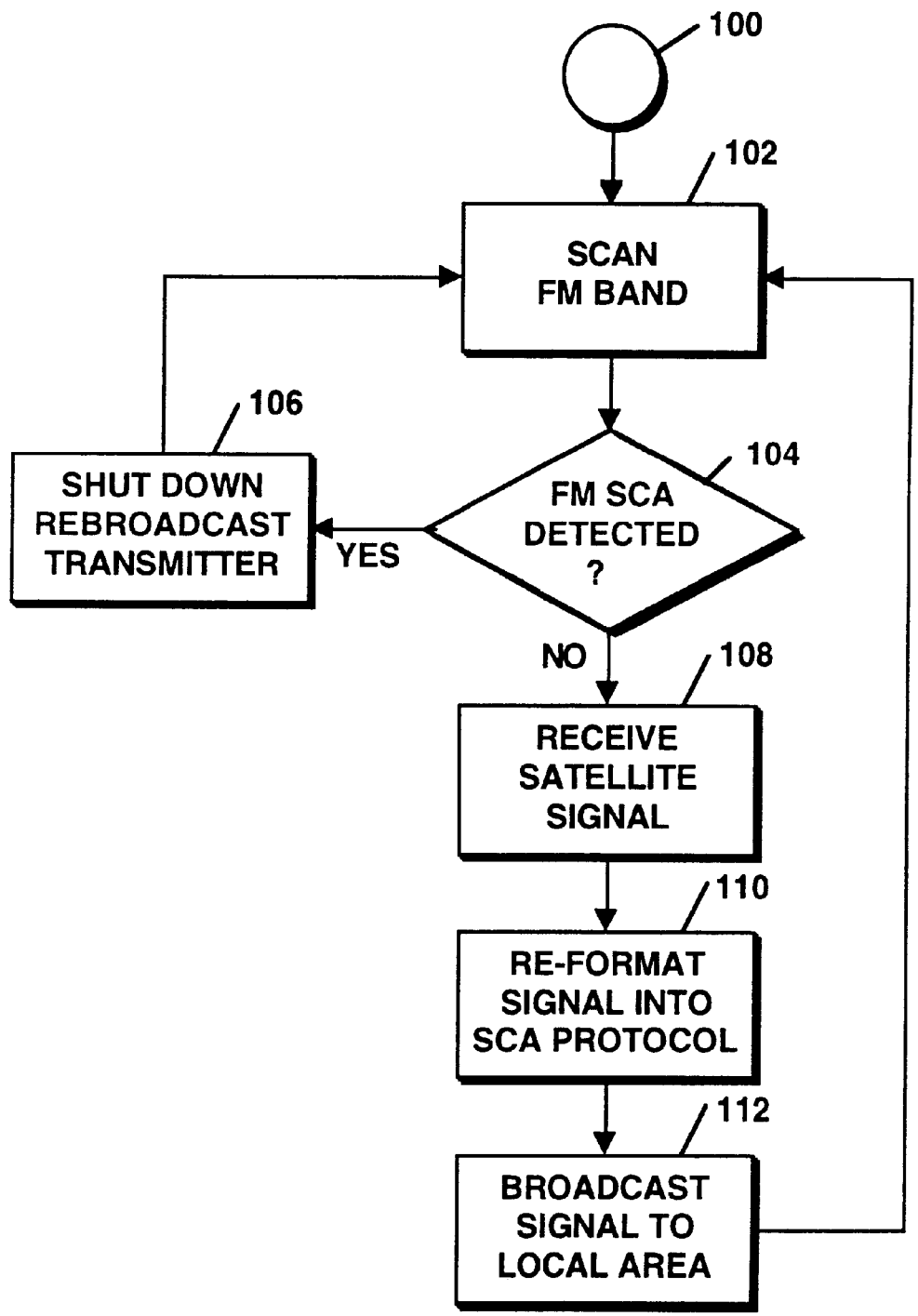
FIG. 3 is a flow chart of a process which may be performed in accordance with the invention.

The invention can also be implemented as a sequence of process steps as shown in FIG. 3. The steps may be carried out by the hardware components shown in FIG. 2 or by a programmable processing unit 62 (FIG. 2) which is connected to control such components.

After an initial process step 100, a step 102 is performed where the FM band is scanned to detect existing signal energy. Control then passes to a step 104.

In this step 104, if FM SCA signals are detected, control passes to a step 106. However, if no such signals are detected in step 104, control passes to step 108.

In step 106, the rebroadcast transmitter 54 is shut down and control returns to step 102.

However, if in step 104 no FM SCA signals are detected, then control passes to step 108 in which the satellite signal is received.

Control then proceeds to step 110 where the signal received from the satellite is reformatted for the local FM SCA rebroadcast. In step 112, the signal is rebroadcast into the area local to the repeater station 23. At this point, control then returns to the scanning step 102.

The invention claimed is:

1. A repeater station for augmenting the coverage area of a paging system in which multiple pagers are located in the vicinity of a vehicle carrying a repeater station, the repeater station comprising:

paging message receiver means, connected to receive a paging message from a primary paging message broadcast transmitter, and for providing a received paging message;

paging message transmitter means, connected to accept the received paging message, for transmitting the received paging message at sufficient low power such that the received paging message is transmitted only to pagers located in the vicinity of the vehicle;

means for determining whether the vehicle is located outside of range of other radio stations; and means for enabling the paging message transmitter means only when the means for determining determines that the vehicle is located outside a range of reception of other radio stations.

2. A repeater station as in claim 1 wherein the means for determining whether the vehicle is located outside of the range of other radio stations includes:

scanning receiver means, connected to periodically scan a radio bandwidth in which the paging message transmitter operates, for determining whether received radio frequency energy in the radio bandwidth exceeds a predetermined threshold.

3. A repeater station as in claim 1 additionally comprising:

means for determining when the vehicle has returned to a location within a range of reception of other radio stations; and means for disabling the paging message transmitter means when the means for determining when the vehicle has returned to a location within a range of reception of other radio stations.

4. A repeater station as in claim 1 wherein the means for determining includes:

position location means for providing a position location information.

5. A repeater station as in claim 1 wherein a pager is associated with each of a plurality of shipping containers carried on the vehicle.

6. A process for a repeater station to deliver a paging message to a pager, the repeater station and pager being located on a vehicle which is traveling outside of the range of terrestrial paging message repeater stations, the method comprising the steps of:

(i) periodically scanning a radio frequency band in which the paging message is to be transmitted to the pager;

(ii) determining if radio signals exist in the radio frequency band;

(iii) if in step (ii) it is determined that radio signals exist in the radio frequency band, disabling any rebroadcast of received paging messages by the repeater station; and (iv) if in step (ii) it is determined that no radio signals exist in the radio frequency band, enabling rebroadcast of received paging messages by the repeater station.

* * * * *